March 23, 1948. R. H. CAMPBELL 2,438,111
STYLUS FOR SOUND REPRODUCTION
Filed Nov. 26, 1945 2 Sheets-Sheet 1
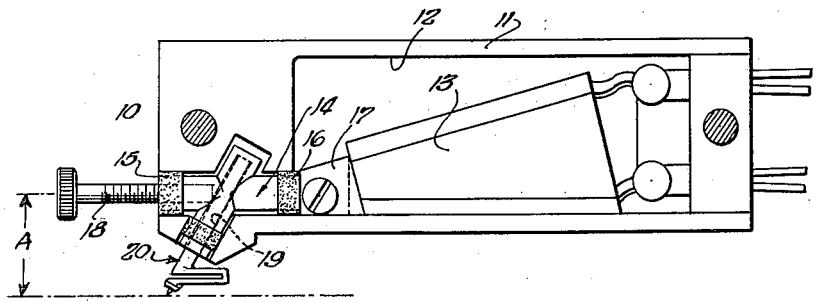
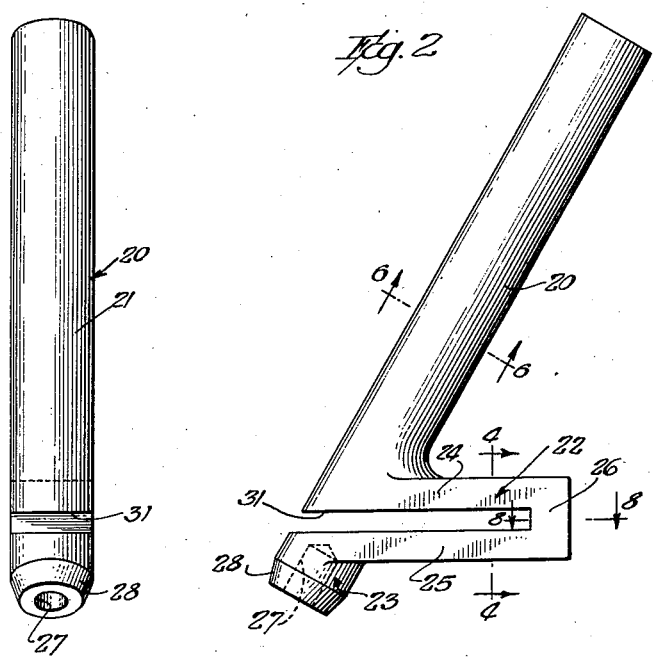
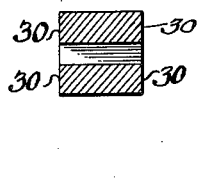
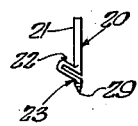
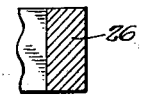
Inventor:
Richard H. Campbell
By: Robert H. Wendt
Atty.

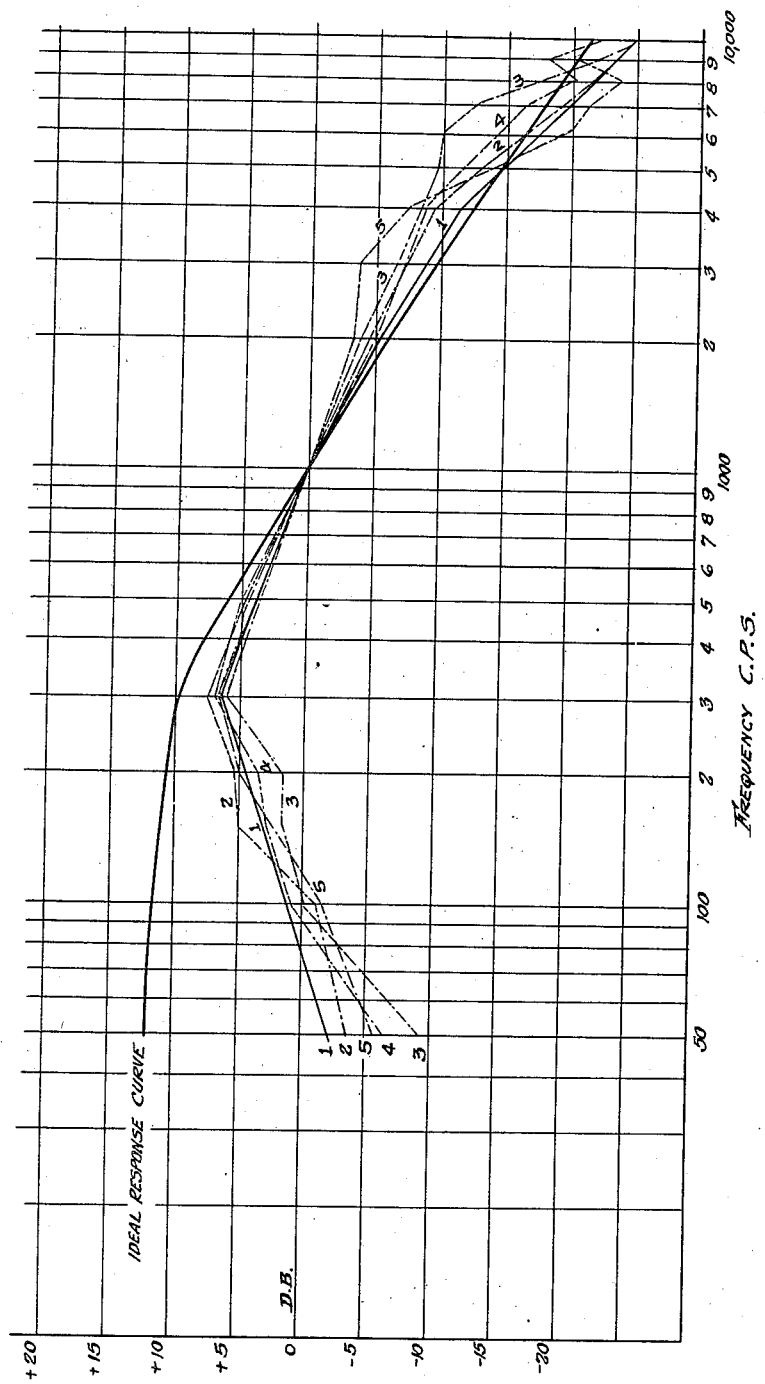

Patented Mar. 23, 1948

2,438,111

UNITED STATES PATENT OFFICE 2,438,111

STYLUS FOR SOUND REPRODUCTION

Richard H. Campbell, Racine, Wis., assignor to Webster Electric Company, Racine, Wis., a corporation of Delaware Application November 26, 1945, Serial No. 630,732

1 Claim. (Cl. 274—38)

The present invention relates to improvements in a stylus for sound reproduction, and is particularly concerned with the provision of an improved stylus adapted to give truer reproduction, lower surface noise, and longer record life than the needles of the prior art.

Tests of various types of needles of the prior art indicate that all those tested had resonance in the frequency band between 3,000 and 10,000 cycles per second. This not only produced undesired increased output at the resonant frequency (which covered a band of several thousand cycles), but the resonance also increased the mechanical noise, due to air movement with these prior art devices.

It should be noted that record surface noise covers substantially all frequencies so that any increased output due to needle resonance results in increased noise level.

Another disadvantage of the needles of the prior art is that the resonances mentioned above build up high needle point pressures, which cause an increase of record wear in the spots on the record where the needle resonance occurs. In some of the needles of the prior art, where the vertical compliance was low, the needle pressures, due to uneven record surface warp of the record or record platter, result in low record life.

One of the objects of the invention is the provision of an improved stylus for sound reproduction from which the foregoing faults have been eliminated or the characteristics improved, and which is characterized by more perfect reproduction, a lower surface noise, and longer record life.

It is a further object of the invention to correct the faults of the prior art needles by providing an improved stylus in which these faults are substantially eliminated or corrected by (a) reducing the needle resonance and by raising the resonant frequency to 10,000 cycles per second or higher, (b) reducing the mechanical noise by proper section design and material selection, (c) also reducing distortion and record noise, increasing the record life, reducing record wear, and improving reproduction by the changes mentioned under (a) and (b).

Another object of the invention is the provision of an improved needle or stylus for sound reproduction, the resonance of which is in a range of frequency to which the human ear is less sensitive, and in which range the dissipation of power by damping is increased.

Another object of the invention is the provision of an improved stylus of the class described having needle resonance above 10,000 cycles per second, because the recorded amplitudes are much less at higher frequencies than those which occur at lower frequences. At frequencies of 10,000 cycles or higher, the harmonics generated are very weak. For example, a 1,000 cycle note would have a very weak harmonic at 10,000 cycles, as the harmonic would be the tenth harmonic. Thus my improved stylus, having needle resonance above 10,000 cycles per second, will substantially eliminate the effects of needle resonance as distinguished from the needles of the prior art, in which needle resonance occurs at the lower frequencies.

Another object of the invention is the reduction of needle resonance amplitude as a whole by providing a needle which has resonance above 10,000 cycles per second, since this amplitude is lowered by the amount of energy which is dissipated at these high frequencies.

Another object of the invention is the reduction of mechanical noise resulting from the use of the stylus of the invention by reducing the mass of the needle point to a minimum, resulting in a high frequency mechanical resonance and by providing a needle shape which reduces the coupling to the air and reduces air movement by reducing the exposed area of the stylus.

Another object of the invention is the provision of an improved stylus which has reduced mechanical noise by providing a structure which results in reduction of chuck resonance, and reduction of distortion in a marked degree, since the coupling between the record and the chuck is made through various spring sections of the needle which have comparatively high compliances.

Another object of the invention is the provision of increased efficiency and reduction of the distortion by providing a needle point which is closer to the axis of the needle chuck and locating the needle point concentric with the axis of the shaft, as distinguished from the devices of the prior art. Conventional types of bent needles of the prior art placed the needle point further forward than the usual 30 degrees from the axis position. This results in a couple which must be overcome by the bearings in the needle, reducing the efficiency of the bearings and resulting in distortion.

Another object of the invention is the reduction of record wear and increase in record life by providing an improved stylus having such vertical and lateral compliance that instantaneous needle pressures are greatly reduced so as to increase record life.

Such instantaneous needle pressures may be caused by the "pinch" effect of recording grooves;

by small blisters, which all records have, due to the uneven covering of shellac; by warpage of the records; and by needle resonance in the devices of the prior art which build up high needle point pressures with increased record wear in the spots where the needle resonance occurs. Instantaneous needle pressures are greatly reduced by providing the high vertical and comparatively high lateral compliance according to the present invention.

Another object of the invention is the provision of an improved stylus, pick-up and tone arm assembly, which shows substantially no resonance peaks in its characteristic curve, and which shows an increased bass response by virtue of the higher lateral comp'iance of the stylus embodying my invention. This can be accomplished by utilizing my improved needle with a tone arm which resonates at low frequencies when measured with compliance of needle.

Other objects and advantages of the invention will appear from the following description and the accompanying drawings, in which similar characters of reference indicate similar parts throughout the several views.

Referring to the drawings, of which there are two sheets,

Fig. 1 is a vertical sectional view taken through a crystal pickup unit equipped with a stylus embodying my invention;

Fig. 2 is an enlarged side elevational view of the stylus shown without its point;

Fig. 3 is a front elevational view of the device of Fig. 2;

Fig. 4 is a sectional view taken on the plane of the line 4—4 of Fig. 2;

Fig. 5 is a full sized view of the stylus embodying my invention;

Fig. 6 is a sectional view taken on the plane of the line 6—6 of Fig. 2, showing the cross section of the shank;

Fig. 7 is a diagrammatic view, showing the output frequency characteristic response curves of the stylii embodying my invention as compared with three other stylii of the prior art and compared with an ideal response curve for Columbia records; and Fig. 8 is a horizontal sectional view taken on the plane of the line 8—8 of Fig. 2, looking in the direction of the arrows.

Referring now to Fig. 1, 10 indicates a crystal pickup assembly in its entirety, the pickup being of the type shown in Dally Patent No. 2,187,772, of January 23, 1940. Such a pickup includes a pair of housing members 11 with a cavity 12 for receiving a suitable crystal 13 which is subjected to torsional stresses by means of a chuck 14.

The chuck 14 is rotatably mounted by means of resilient rubber bearings 15, 16 mounted in the housing, and has clamping means 17 for securement to the crystal, the other end of the crystal being clamped by the housing. The chuck has a clamping screw bolt 18, which extends into a needle bore 19 and clamps the shank of a stylus 20, the needle bore being preferably at an angle of thirty degrees, but the angle may be varied considerably while using the present stylus. 20 indicates a stylus embodying the present invention, and this stylus is preferably constructed of one of the lightest metals, such as magnesium alloy, because of its lighter weight and greater stiffness; but, in some embodiments of the invention, the needle may be made of other metals, aluminum being the next preferred on account of its relative lightness.

The stylus 20 comprises a shank portion 21, which is preferably substantially cylindrical, and the shank portion is provided at its lower end with a substantially U-shaped spring portion 22 carrying a point supporting portion 23.

The shank 21 is of sufficient size to be received in the usual needle chuck bore 19; and due to its relative softness as compared with the clamping screw bolt 18, it does not need a flattened portion, as the pointed conical end of the screw bolt 18 is adapted to form a depression in the shank, assuring the firm engagement of the shank in its bore and driving the shank upward in the bore until it hits the end of the bore.

In Fig. 2 the enlarged view of the stylus has the shank disposed at an angle of thirty degrees to the vertical, which is substantially the position in which it is usually employed. When so employed, the spring portion 22 has its legs 24, 25 extending substantially horizontally and parallel to each other; but the angle between the spring portion and the shank may be changed when the needle is to be employed at a different angle.

The legs 24, 25 of the spring portion 22 are joined by a vertically extending yoke 26, and the shank, spring portion, and point holding portion are preferably formed out of one integral piece of metal.

The spring legs 24, 25 and spring yoke 26 are preferably substantially rectangular in cross section, as shown in Figs. 4 and 6. The spring portion 25 supports the point holding portion 23, which extends diagonally downward and is located on the same axis as the shank 21.

The point holding portion 23 is preferably as short as possible to reduce the mass of the moving parts, its size being determined by the size of the bore 27, which extends axially into the end and is adapted to hold the point which may be made of sapphire or osmium, and is preferably of the latter.

Other embodiments of the invention may utilize any of the materials available for points. The end portion 28 of the point holding portion 23 is preferably tapered to frustoconical shape, and the point 29 may be held frictionally, or may have a portion which is engaged by a spun-over portion of the stylus portion 23. The shape of the point 29 may be similar to the points of the prior art, being provided with frustoconical side portions and a rounded end for engaging in the groove of a record. At its upper end the point body is cylindrical and complementary to the bore 27.

Referring now to Fig. 7, this is a diagrammatic illustration of curves plotted to show the response in decibels at various frequencies in cycles per second. A perfect reproduction unit would produce a flat response from 50 to about 325 cycles and then drop 6 decibels per octave to approximately 4,000 cycles. From 4,000 to 10,000 cycles in curve of such a perfect unit there should be slightly over 6 decibels per octave drop. Such a curve is indicated on the chart of Fig. 7, as an ideal response curve in full lines.

Curves 1 and 2 are curves showing the response in decibels at various frequencies of two of the stylii of the applicant, while curves 3, 4 and 5 are response curves of three of the devices of the prior art, all of these devices having been tested with pickups and tone arms of the type disclosed in the prior patent abovementioned.

Curve No. 2 shows the test of the needle when provided with a sapphire point, while curve No. 1, which is the best curve, relates to the test of a needle using an osmium point. All of these curves were produced when using the same Columbia test records.

My needle shows no resonance peaks up to 10,000 cycles, but the other needle curves clearly show resonance at the high frequencies between 3,000 and 10,000 cycles. Needle No. 5, for example, clearly shows two resonances, one at 3,000 cycles, which is the resonance of the combination of needle resonance and needle chuck resonance; and another at 9,000 cycles, which is the needle resonance.

The higher output of the needle Nos. 3, 4, and 5 at high frequencies, compared to the two needles Nos. 1 and 2 of the applicant, is the result of resonance; and therefore they have more distortion and undesirable record noise than the applicant's needle.

The low frequency curves indicate some tone arm resonance. Each needle, because of its different lateral compliance, produced a different resonance in combination with the needle chuck compliance and inertia of the needle pickup arm. The increased bass response of the applicant's needles is due to a lower frequency arm resonance by virtue of higher lateral compliance of the applicant's needle.

The difference in response between needle No. 1 with an osmium point and needle No. 2 with a sapphire point is due to slightly different cross section and lengths; and the osmium pointed needle is the best. Also, the needle is preferably made of magnesium alloy rather than aluminum because of the lighter weight and greater stiffness of magnesium alloy over aluminum.

It will thus be observed that I have invented an improved phonograph needle which has a marked decrease in the mechanical noise, which gives truer reproduction, lower surface noise, and longer record life than the needles of the prior art. The faults of the needles of the prior art have been corrected by reducing needle resonance and raising the resonance frequency to 10,000 cycles per second or higher; by so changing the section, design and material selection that the mechanical noise is reduced; and these changes have also reduced distortion and record noise.

Each of the sections of my needle has small mass and short length, which results in resonance well above 10,000 cycles per second in each section, as well as in the whole needle.

The mass of the needle point is reduced to a minimum, resulting in a high frequency mechanical resonance which reduces the mechanical noise. The narrow edge surface 30 reduces air movement; and the spring section being bent back on itself, with very close spacing, reduces the coupling to the air by reducing the exposed area.

Some energy (at high frequencies, which are objectionable) is dissipated by the compression of air between the closely spaced spring sections 24 and 25.

Needle chuck resonance usually occurs between 2,000 and 6,000 cycles per second, as the coupling between the record and the chuck is made through the various spring sections of the needle, which have comparatively high compliances, chuck resonance and distortion are reduced to a marked degree.

Compliance of needle sections of different resonance frequencies absorbs energy reflected from the needle chuck. By having the needle point closer to the axis of the needle chuck (distance A) higher efficiency and less distortion results. The bent needle type of the prior art placed the needle point further forward than the usual thirty degrees from the axis position, resulting in a couple which must be overcome by the bearings in the needle, reducing the efficiency of the bearings and resulting in distortion.

As the applicant's needle point is concentric with the shaft, the conventional thirty degree angle may be used, but the needle may be made with the point at other angles less than thirty degrees.

As compared with the conventional needles of the prior art having little or no vertical and lateral compliance, instantaneous pressures of those needles are much greater than those secured with the applicant's needle. Therefore, a substantial increase in record life can be obtained by using the present needles.

Frequency distortion in a pickup is primarily made by a combination of needle and chuck resonance. The applicant's needle attenuates the needle chuck response, thereby reducing frequency distortion materially. The response of the applicant's needle more closely approaches the ideal response curve than any of the devices of the prior art.

The vertical compliance of the present needle is higher than other types of bent needles due to the reduced sectional thickness at 24, 25, and 26, and due to the length of the spring sections 24 and 25. The sectional thickness of the portions 24, 25 is such that they would be too weak for ordinary use, but the bent sections are separated by the slot 31, the width of which is predetermined to prevent the elastic limit being exceeded in sections 24 and 25 when the point is moved in such a direction as to close the slot 31.

The lateral compliance is low in comparison to the vertical compliance because the lateral spring section width is approximately twice the vertical thickness of the sections 24 and 25. Some lateral compliance in a needle is desirable to reduce needle chuck resonance, but low lateral compliance is required to prevent excessive loss in driving power applied to the needle chuck, and the present needle has a low lateral compliance. The contour of the needle also presents a narrow streamlined edge 30 to lateral movement, thus reducing the air movement appreciably.

The unsprung mass of the present needle is lower than in the devices of the prior art, due to a reduction in weight of the needle point. This is accomplished by making the needle point socket as short and small as possible, whereas the conventional bent needles of the prior art have a large radius between the needle point and the spring section, which gives a greater point weight and shorter effective spring.

All of these details of structure and characteristics combine to make a needle which gives truer reproduction, lower surface noise, and longer record life than any of the devices of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

A stylus for sound reproduction, comprising a metal member having a shank for securement in a chuck, said shank supporting a substantially U-shaped laterally extending integral spring, said spring having a pair of relatively flat parallel legs separated by a parallel sided slot, the shank being secured to one of said legs, and the other of said legs supporting an enlargement of minimum size adapted to be provided with a socket for receiving a point member, a point member located in said socket and having a minimum length to reduce the unsprung mass of the point supporting portion of said stylus, said U-shaped spring extending substantially parallel to a record, when the stylus shank is disposed at a predetermined tracking angle, and the other of said flat legs of said spring being longer, to locate the point member substantially on the axis of the shank, thereby eliminating any tendency of the point member to turn the stylus in its chuck, the said slot between the legs of said U-shaped spring being open, and the walls thereof being spaced slightly from each other so that when a tone arm bearing the needle is dropped, the spring may take up the shock, but the shock will result in the momentary closing of the end of the slot without permanent deformation of the stylus, said stylus having an inherent needle resonance frequency of more than 10,000 cycles per second, and the cross-sectional shape of the parts of said spring being substantially rectangular and of wider dimension laterally than vertically, whereby the lateral compliance is low in comparison with the vertical compliance, the low lateral compliance preventing an excessive loss in driving power applied to the needle chuck.

RICHARD H. CAMPBELL.

REFERENCES CITED

The following references are of record in the file of this patent:

UNITED STATES PATENTS

| Number | Name | Date |
| --- | --- | --- |
| 881,594 | Konigstein | Mar. 10, 1908 |
| 1,281,135 | Claybrook | Oct. 8, 1918 |
| 1,490,875 | Wellman | Apr. 15, 1924 |